United States Patent
Ewers et al.

(10) Patent No.: US 7,377,571 B2
(45) Date of Patent: May 27, 2008

(54) COLLAPSIBLE SEAT MECHANISM WITH INTEGRATED SUBFLOOR

(75) Inventors: David J Ewers, Leonard, MI (US); Gary A Kavanagh, Shelby Township, MI (US); Glen M Kondratek, Sterling Heights, MI (US); Carl Mather, Lake Orion, MI (US)

(73) Assignee: Chrysler LLC, Auburn Hills, MI (US)

( * ) Notice: Subject to any disclaimer, the term of this patent is extended or adjusted under 35 U.S.C. 154(b) by 120 days.

(21) Appl. No.: 11/254,958

(22) Filed: Oct. 20, 2005

(65) Prior Publication Data

US 2007/0090663 A1    Apr. 26, 2007

(51) Int. Cl.
*B60N 2/02* (2006.01)

(52) U.S. Cl. ............................ 296/65.09; 297/15
(58) Field of Classification Search ............ 296/65.09, 296/65.05, 66; 297/15
See application file for complete search history.

(56) References Cited

U.S. PATENT DOCUMENTS

| 267,382 A * | 11/1882 | Underhill et al. .............. 297/15 |
| 1,933,623 A | 11/1933 | Gordon |
| 3,151,906 A | 10/1964 | Roberts |
| 3,202,453 A | 8/1965 | Richards |
| 3,476,435 A | 11/1969 | Hitzelberger |
| 3,746,389 A | 7/1973 | Fourrey |
| 4,341,415 A | 7/1982 | Braun et al. |
| 4,699,418 A | 10/1987 | Plavetich |
| 4,869,541 A | 9/1989 | Wainwright |
| 4,932,706 A | 6/1990 | Wainwright et al. |
| 4,932,709 A | 6/1990 | Wainwright |
| 5,116,097 A | 5/1992 | Bulgari |
| 5,195,795 A | 3/1993 | Cannera et al. |
| 5,240,302 A | 8/1993 | Yoshida et al. |
| 5,269,581 A | 12/1993 | Odagaki et al. |
| 5,280,987 A | 1/1994 | Miller |
| 5,348,261 A | 9/1994 | Nini |
| 5,360,272 A | 11/1994 | Schmale et al. |
| 5,372,398 A | 12/1994 | Aneiros et al. |
| 5,398,995 A | 3/1995 | Hurite |
| 5,482,346 A | 1/1996 | Lesourd |
| 5,492,386 A | 2/1996 | Callum |
| 5,498,051 A | 3/1996 | Sponsler et al. |
| 5,527,087 A | 6/1996 | Takeda et al. |
| 5,611,589 A | 3/1997 | Fujii et al. |
| 5,681,077 A | 10/1997 | Hashimoto |

(Continued)

*Primary Examiner*—Hilary Gutman
*Assistant Examiner*—Melissa Black
(74) *Attorney, Agent, or Firm*—Ralph E. Smith

(57) ABSTRACT

A stowable seat assembly for a vehicle, the seat assembly including a seat, a seat receiving recess in a floor of a vehicle, an upper riser mechanism, a lower riser mechanism and a panel. The upper riser mechanism is coupled to the seat for movement of the seat between an elevated position and a collapsed position. The lower riser mechanism is coupled to the seat receiving recess for movement of the seat between a collapsed position and a stowed position. The panel is positioned between, and coupled to, the upper and lower riser mechanisms. The panel is arranged to conceal the seat receiving recess when the seat is in an elevated position, and is movable into the seat receiving recess when the seat is in a collapsed position to permit the seat to be stowed in the seat receiving recess.

9 Claims, 5 Drawing Sheets

U.S. PATENT DOCUMENTS

| | | |
|---|---|---|
| 5,800,015 A | 9/1998 | Tsuchiya et al. |
| 5,868,451 A | 2/1999 | Uno et al. |
| 7,029,063 B2 * | 4/2006 | Holdampf .................... 297/15 |
| 7,108,323 B2 * | 9/2006 | Welch et al. ............ 297/284.9 |

* cited by examiner

# COLLAPSIBLE SEAT MECHANISM WITH INTEGRATED SUBFLOOR

FIELD OF THE INVENTION

The present invention relates to a seat assembly for a motor vehicle and more particularly to a seat assembly permitting movement between a seating position and a stowed position.

BACKGROUND OF THE INVENTION

Automotive vehicles include seat assemblies for supporting occupants within the vehicle. Recently vehicles featuring folding seat assemblies providing for the mechanical folding operation of a seat between a seating position and a collapsed, stowed position providing for a level load floor have become a popular feature in vehicles such as minivans.

Conventional stowable seat assemblies typically are placed into the stowed position by folding the seat back flat against the seat cushion, and then rotating the seat assembly about a pivot, commonly attached to either the front or rear legs of the seat, into a tub or bin located in the floor of the vehicle. For example, commonly owned U.S. Pat. No. 6,869,138 to Rhodes, et al. provides a forward facing seat assembly that is capable of being stowed by pivoting the seat about an upper pivot located on one of the legs pivotably attached to the seat assembly.

Generally, such known seat assemblies are typically capable of assuming one of three positions for use in the vehicle. First, the seat assembly is capable of being placed into a deployed position for carrying a passenger. Second, the seat assembly may be placed into a folded down position, in which the seat back is folded down onto the seat cushion providing the seat back as a load carrying surface. Finally, the seat assembly may be placed into a stowed position, with the seat stowed beneath the floor of the vehicle and providing a level load surface within the vehicle. However, when the seat assembly is in the folded down position, the legs of the vehicle seat are still deployed which reduces the cargo carrying capacity of the vehicle by decreasing the distance between the seat back and the ceiling of the vehicle.

It is therefore desirable to provide a seat assembly that is capable of both assuming a position in which the seat assembly remains above the floor of the vehicle while the legs are collapsed and assuming a stowed position which provides a level load floor in the rear of the vehicle.

SUMMARY OF THE INVENTION

Accordingly, one aspect of the present invention provides a stowable seat assembly for a vehicle which is capable of both assuming a position in which the seat assembly remains above the floor of the vehicle while the legs are collapsed and assuming a stowed position which provides a level load floor in the rear of the vehicle, the seat assembly including a seat, a seat receiving recess in a floor of a vehicle, an upper riser mechanism, a lower riser mechanism and a panel. The upper riser mechanism is coupled to the seat for movement of the seat between an elevated position and a collapsed position. The lower riser mechanism is coupled to the seat receiving recess for movement of the seat between a collapsed position and a stowed position. The panel is positioned between, and coupled to, the upper and lower riser mechanisms. The panel is arranged to conceal the seat receiving recess when the seat is in an elevated position, and is movable into the seat receiving recess when the seat is in a collapsed position to permit the seat to be stowed in the seat receiving recess.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
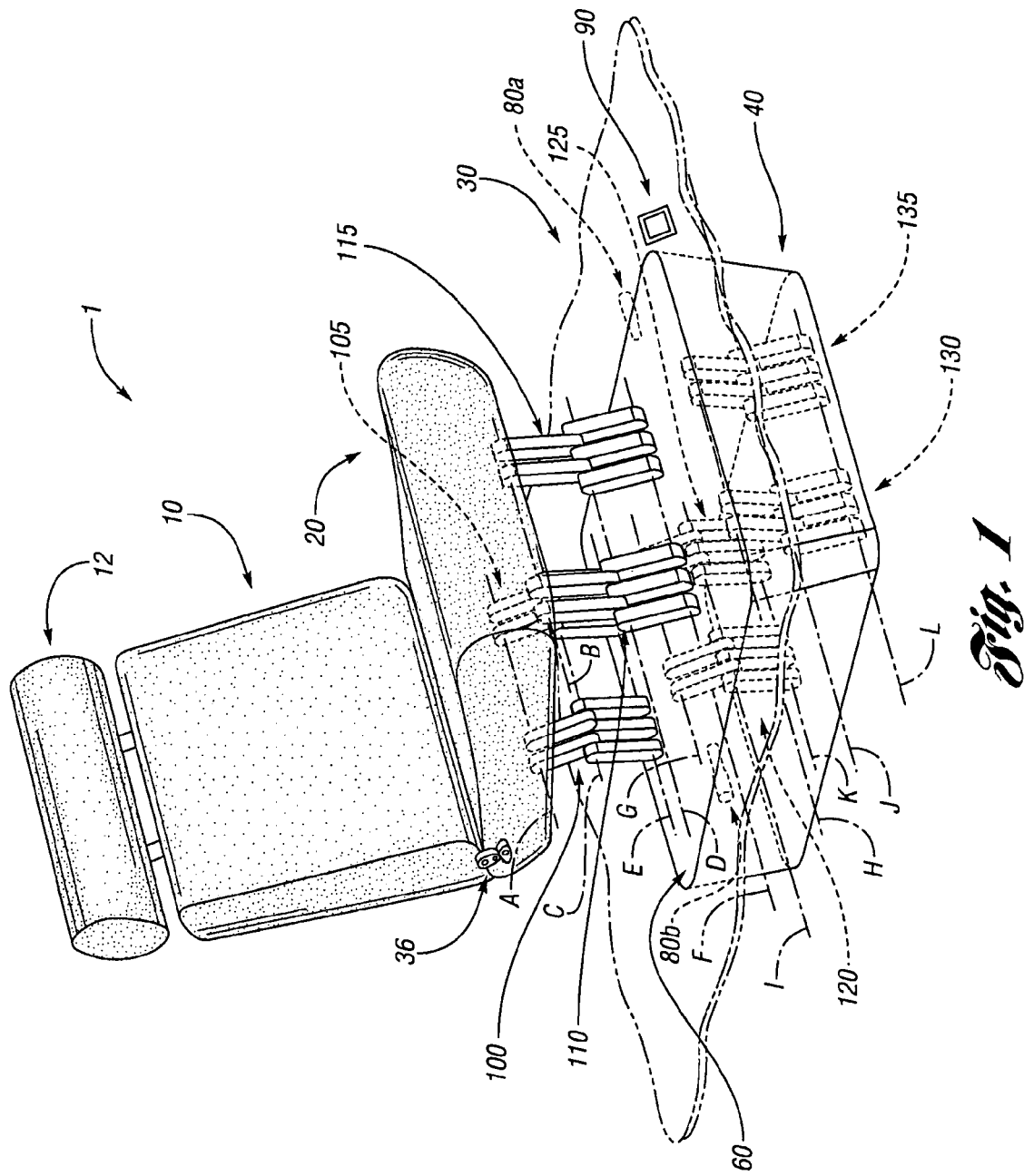
FIG. 1 is a perspective view of a seat assembly in a seating position according to a first exemplary embodiment of the present invention.

Turning now to the drawings, FIG. 1 shows a stowable seat assembly 1 for a vehicle having a floor 30 according to a first exemplary embodiment of the present invention. A seat receiving recess 40 is located in the floor 30 of the vehicle. Seat assembly 1 includes a seat 20, a foldable seat back 10, an upper riser mechanism, a panel 60, a lower riser mechanism, and a pivotable headrest 12. The seat 20 is pivotally coupled to the foldable seat back 10 by a recliner mechanism 36 of any suitable type known to those skilled in the art. The recliner mechanism 36 can be biased between a locked and an unlocked state to permit selective movement of the seat back 10. In the unlocked state, the recliner mechanism 36 permits adjustment of the seat back 10 between a plurality of generally upright seated positions and a position that is substantially parallel to the seat 20. In the locked state, the recliner mechanism 36 prevents pivotal movement of the seat back 10 relative to the seat 20. The recliner mechanism 36 is normally biased toward the locked state.

Figure 2A:
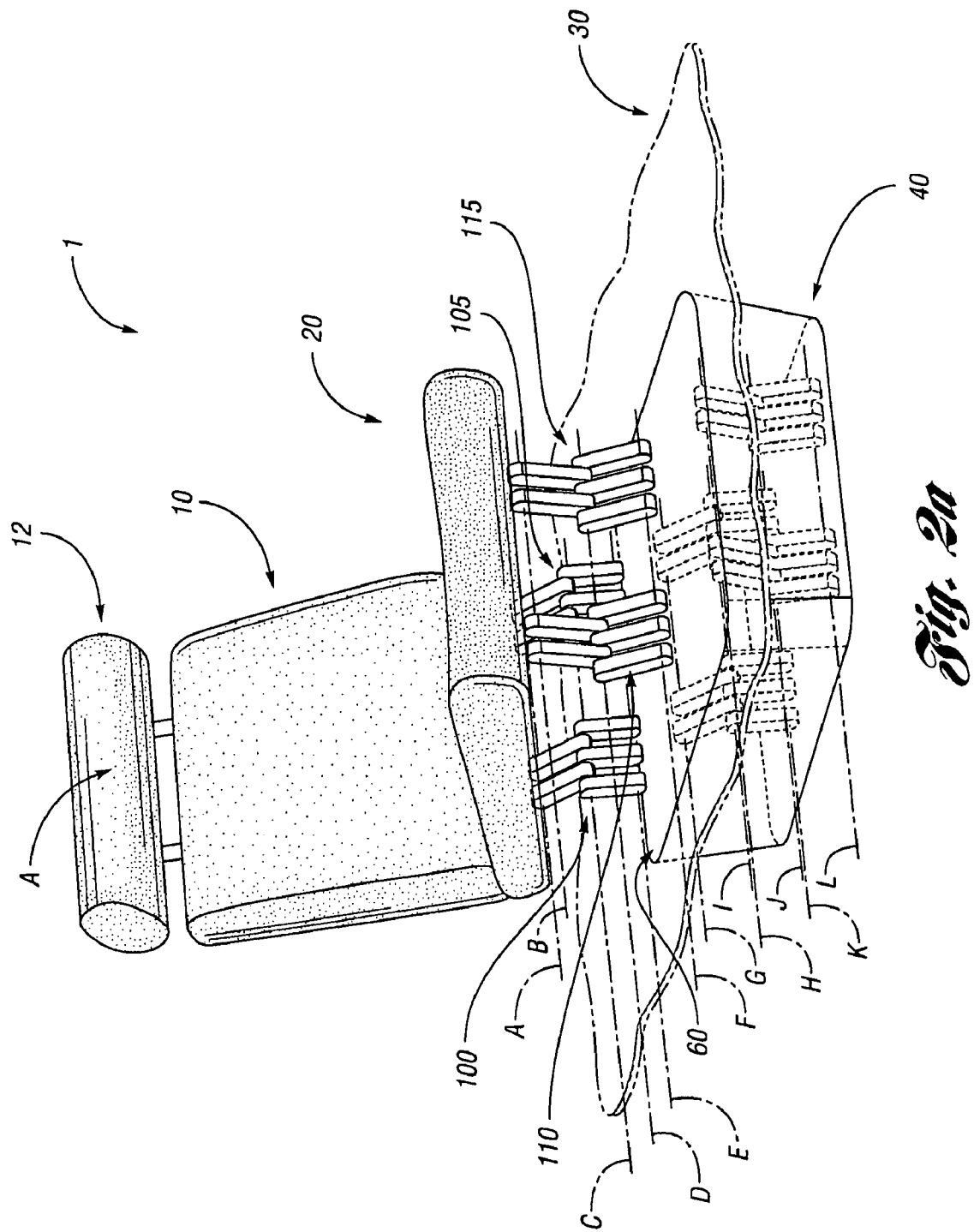
FIG. 2a is a perspective view of a seat assembly according to a first exemplary embodiment of the present invention.

The upper riser mechanism operatively attaches the seat 20 to the panel 60. The upper riser mechanism permits selective movement of the seat 10 between a elevated position, as shown in FIG. 2a, and a collapsed position, as shown in FIG. 2d. In a first exemplary embodiment, the upper riser mechanism includes a pair of hinge mechanisms 100, 105, 110 and 115 forming front and rear rigid leg supports. The lower riser mechanism operatively attaches the panel 60 to the seat receiving recess 40. The lower riser mechanism permits selective movement of the seat 10 between a collapsed position, as shown in FIG. 2d, and a stowed position, as shown in FIG. 2e. In a first exemplary embodiment, the lower riser mechanism includes a pair of lockable/releasable hinge mechanisms 120, 125, 130 and 135 forming front and rear rigid leg supports.

In both the elevated position and the collapsed position, panel 60 is flush with the floor 30 and operates to conceal the seat receiving recess 40. Those skilled in the art will appreciate that the panel 60 can be positioned otherwise and still cover the seat receiving recess 40. In the stowed position, the panel 60 is contained within the seat receiving recess 40 along with the seat assembly 1.

Figure 2B:
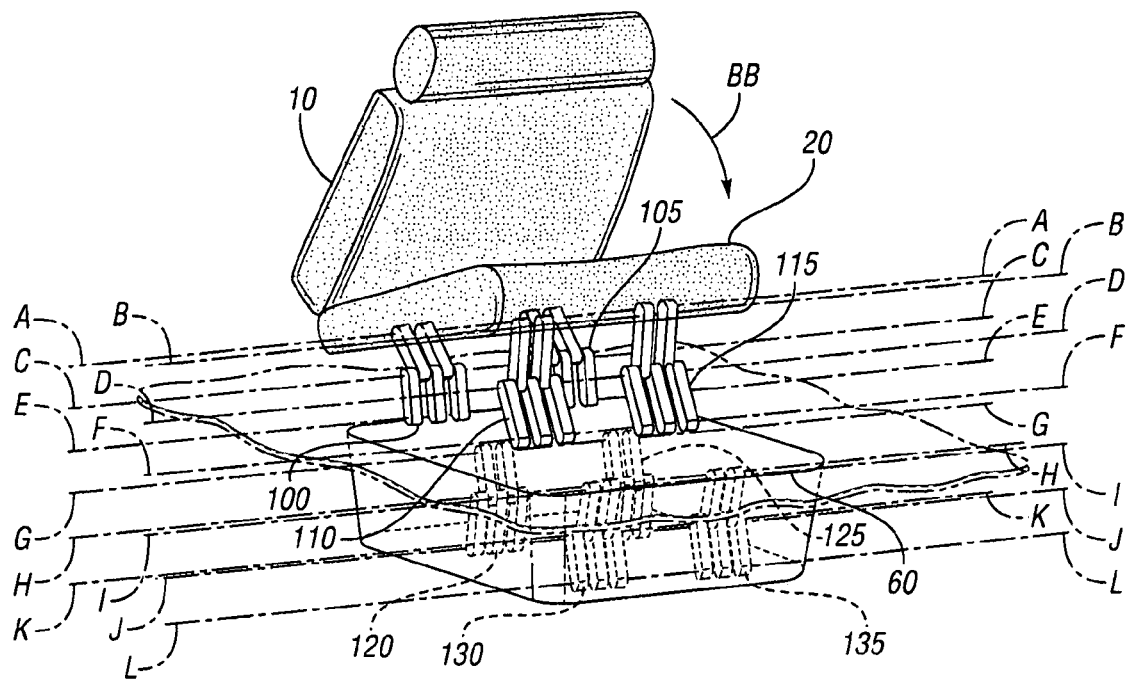
FIG. 2b is a perspective view of a seat assembly according to a first exemplary embodiment of the present invention.
Figure 2C:
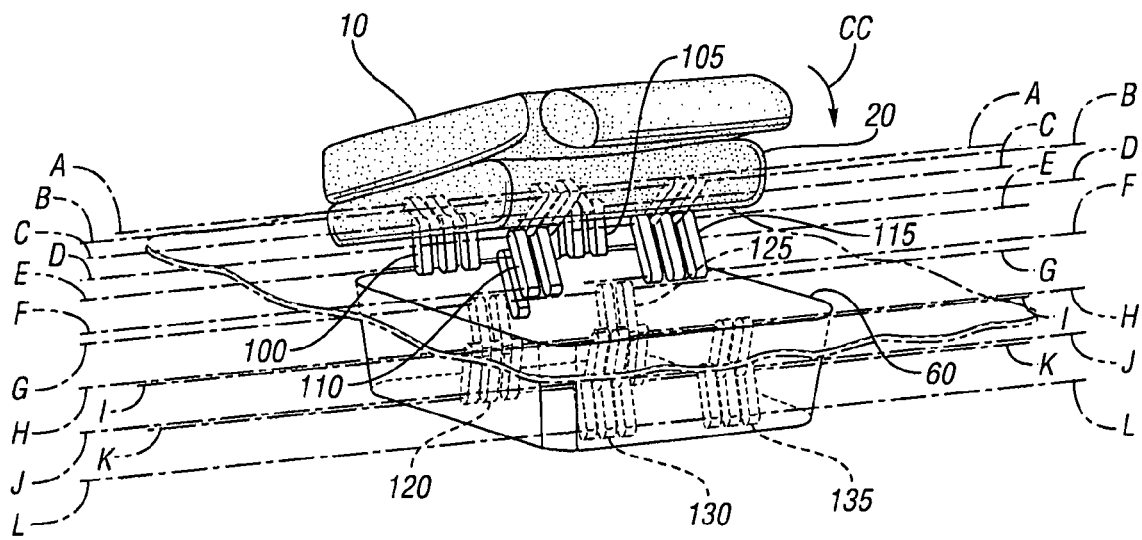
FIG. 2c is a perspective view of a seat assembly according to a first exemplary embodiment of the present invention.
Figure 2D:
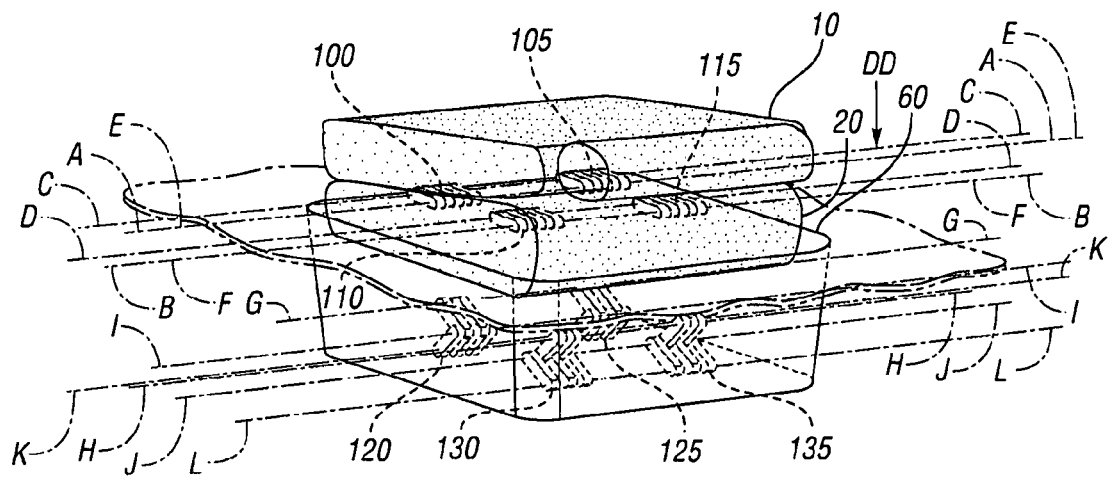
FIG. 2d is a perspective view of a seat assembly according to a first exemplary embodiment of the present invention.
Figure 2E:
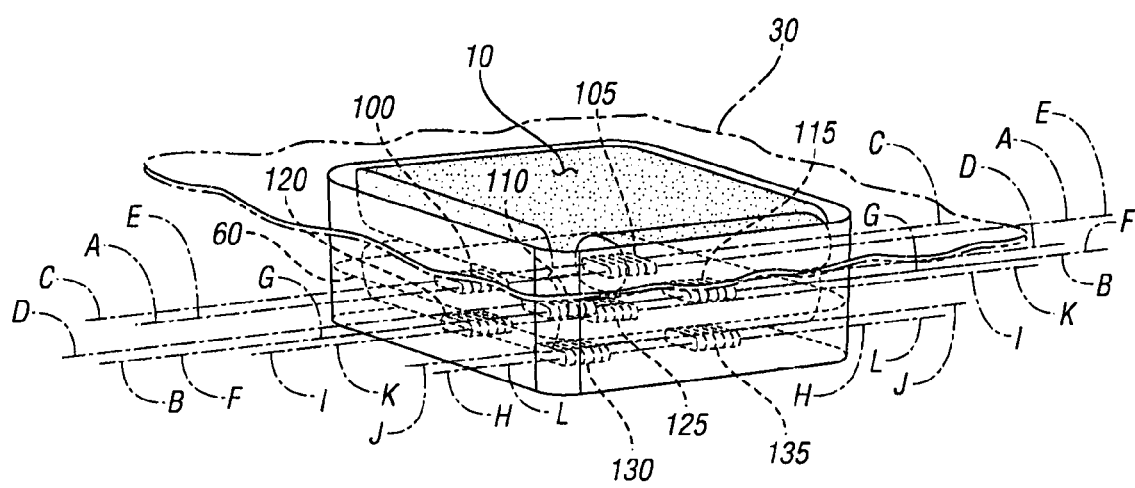
FIG. 2e is a perspective view of a seat assembly according to a first exemplary embodiment of the present invention.

When the seat 20 is in the elevated position, as shown in FIGS. 1, 2a and 2b, the seat 20 extends substantially perpendicular to the legs, with the legs elevated above the floor 30 of the vehicle, and the seat back in either the open or the folded position of the seat back, as shown in FIGS. 2a and 2c. The back side of the seat back 10 can be configured to provide cup holders, or to form a mini-table, when the seat back 10 is in the folded position, as is known in the art.

When the seat 20 is in the collapsed position, as shown in FIG. 2d, the seat 20, with the seat back 10 folded thereupon, rests on the panel 60 and extends substantially parallel to the floor 30, with the upper legs 100, 105, 110 and 115 in a collapsed position, as shown in FIG. 2d.

When the seat 20 is in the stowed position, as shown in FIG. 2e, the seat 20, with the seat back 10 folded thereupon, extends substantially parallel to the floor 30 and is contained within the seat receiving recess 40, with both the upper legs 100, 105, 110 and 115 and lower legs 120, 125, 130 and 135 in a collapsed position, as shown in FIG. 2e.

The steps required for stowing the seat 20 in the seat receiving recess 40 are shown sequentially in FIGS. 2a-2e. Starting in the elevated position, the headrest 12 of the seat assembly 1 is first pivoted forward and downward in the direction of arrow AA, as shown in FIG. 2a. The seat back 10 is then pivoted forward and downward in the direction of arrow BB, until the seat back 10 comes to rest against the seat 20 in a position that is substantially parallel to the seat 20, as shown in FIGS. 2b and 2c. The upper legs can then be released such as by connection of a latch to a seat back release lever/mechanism (as understood by one of ordinary skill in the art) so that the seat 20 and seat back 10 are then moved downward in the direction of arrow CC into the collapsed position by pivoting the upper legs 100, 105, 110 and 115 inward relative to the forward and rearward edges of the seat 20 about pivots axes A, B, C, D, E, and F.

The seat 20 and seat back 10 will remain in the collapsed position until a latch mechanism locking the panel 60 into flush alignment with the floor 30 is released. In an exemplary embodiment, the latch mechanism consists of a plurality of biased pins 80a, 80b contained within the floor 30 at the junction of the floor 30 and panel 60 and a release lever 90 operatively connected to the biased pins 80a, 80b. The latch mechanism is biased into a locked position in which the pins 80a, 80b engage the panel 60 until the release lever is actuated. Finally, after releasing the latch mechanism, the seat 20, seat back 10, and panel 60 can be moved downward in the direction of arrow DD into the stowed position by pivoting the lower legs 120, 125, 130 and 135 inward relative to the forward and rearward edge of the seat 20 about pivot axes G, H, I, J, K, and L. The steps are reversed for moving the seat 20 from the stowed position to the deployed position of the seat 20.

Figure 3:
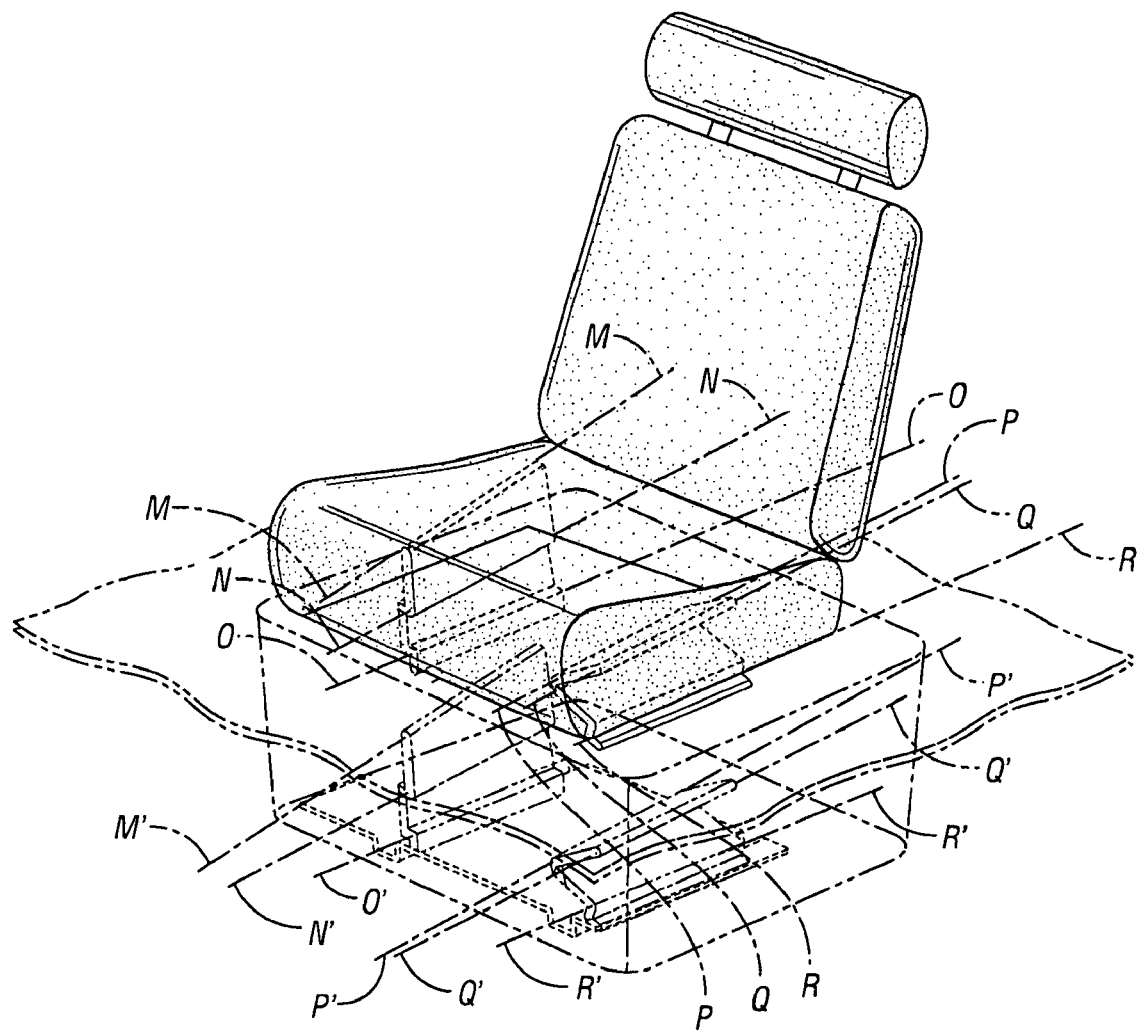
FIG. 3 is a perspective view of a seat assembly according to a second exemplary embodiment of the present invention.

Next, a seat assembly 2 according to a second exemplary embodiment of the present invention is described with reference to FIG. 3. With respect to parts and components having the similar function and effect to those of the first embodiment, the same reference numbers are affixed and the detailed explanation thereof is omitted.

Seat assembly 2 includes a seat 20, a foldable seat back 10, an upper riser mechanism, a panel 60, a lower riser mechanism, and a pivotable headrest 12. The upper riser mechanism operatively attaches the seat 20 to the panel 60. The upper riser mechanism includes hinge mechanisms 200 and 210 forming rigid leg supports for the seat 20. The lower riser mechanism operatively attaches the panel 60 to the seat receiving recess 40. The lower riser mechanism includes hinge mechanisms 220 and 230 forming rigid leg supports beneath the panel 60.

The seat 20 and seat back 10 are then moved downward into the collapsed position by pivoting the upper riser members 200 and 210 inward relative to the right and left edges of the seat 20 about pivots axes M, N, O, P, Q, and R. Finally, after engaging the release mechanism, the seat 20, seat back 10, and panel 60 can be moved downward into the stowed position by pivoting the lower riser members 220 and 230 inward relative to the right and left edges of the seat 20 about pivot axes M', N', O', P', Q', and R'. The steps are reversed for moving the seat 20 from the stowed position to the deployed position of the seat 20.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A stowable seat assembly for a vehicle, the seat assembly comprising:
    a seat;
    a seat receiving recess in a floor of a vehicle;
    an upper riser mechanism coupled to said seat for movement of said seat between an elevated position and a collapsed position upon the vehicle floor;
    a lower riser mechanism, said lower riser mechanism coupled to said seat receiving recess for movement of said seat between the collapsed position and a stowed position in the seat receiving recess; and
    a panel positioned between and coupled to said upper riser mechanism and said lower riser mechanism, wherein said panel remains stationary and conceals said seat receiving recess while said seat is moving between said elevated position and said collapsed position and said panel is movable into said seat receiving recess when said seat is moving from said collapsed position to said stowed position permitting said seat to be stowed in said seat receiving recess.

2. The stowable seat assembly of claim 1, said seat assembly further comprising a release mechanism arranged to engage the panel, wherein said release mechanism permits the movement of said panel into said seat receiving recess thereby enabling movement of said seat between said collapsed position and said stowed position.

3. The stowable seat assembly of claim 1 wherein said lower riser mechanism is pivotally coupled to said panel and to said seat receiving recess.

4. The stowable seat assembly of claim 1 wherein said upper riser mechanism is pivotally coupled to said panel and to said seat.

5. The stowable seat assembly of claim 1, said seat further comprising a seat bottom and a seat back pivotally coupled to said seat bottom, wherein said seat back is folded down onto said seat bottom when said seat is in said collapsed position.

6. The stowable seat assembly of claim 1, said seat further comprising a seat bottom and a seat back pivotally coupled to said seat bottom, wherein said seat back is substantially flush with said floor when said seat is in said stowed position.

7. The stowable seat assembly of claim 1 said seat further comprising a seat bottom and a seat back pivotally coupled to said seat bottom, wherein said seat further includes a headrest assembly pivotally coupled to said seat back.

8. The stowable seat assembly of claim 1 wherein one of said upper riser mechanism or said lower riser mechanism comprises a hinge mechanism oriented to fold inward relative to one of a front or a rear edge of said seat.

9. The stowable seat assembly of claim 1 wherein one of said upper riser mechanism or said lower riser mechanism comprises a hinge mechanism oriented to fold inward relative to a side edge of said seat.

* * * * *